United States Patent [19]

Florio

[11] 4,022,524
[45] May 10, 1977

[54] EYEGLASS FRAME

[76] Inventor: Cesare Florio, 2581 SW. 7th St., Fort Lauderdale, Fla. 33312

[22] Filed: Oct. 31, 1975

[21] Appl. No.: 627,677

[52] U.S. Cl. .................... 351/83; 351/87; 351/154
[51] Int. Cl.² .............................. G02C 1/00
[58] Field of Search ............. 351/83, 86, 87, 154, 351/41

[56] References Cited
UNITED STATES PATENTS

| 1,647,626 | 11/1927 | Hopson | 351/154 X |
| 2,270,382 | 1/1942 | Nerney | 351/154 |
| 3,758,202 | 9/1973 | Chunga, Sr. | 351/154 |
| 3,884,561 | 5/1975 | Kodys | 351/83 |

Primary Examiner—Saxfield Chatmon, Jr.
Attorney, Agent, or Firm—Kramer & Brufsky

[57] ABSTRACT

A spectacle or eyeglass frame that is especially designed such that when placed down the lenses thereof are protected from coming in contact with the surface thereby avoiding scratching.

4 Claims, 3 Drawing Figures

EYEGLASS FRAME

BACKGROUND OF THE INVENTION

This invention relates to eyeglass frames. More particularly, the invention relates to eyeglass frames having a unique construction which substantially reduces and protects the lens from being scratched. A problem encountered by eyeglass wears is the unavoidable scratching that occurs to the lens when the glasses are placed down without putting them in a case therefor.

The prior art teaches a variety of eyeglass frames; for example those disclosed in U.S. Pats. Nos. 1,690,139; 1,987,206; 2,574,839; 2,629,196; 3,001,200; 3,552,840; 3,582,193; 3,869,200; and others. The foregoing are deficient, however, in that they fail to provide for the protection as aforementioned.

SUMMARY OF THE INVENTION

It is accordingly an object of the instant invention to provide for an improved eyeglass frame.

It is another object to provide for a frame that accomplishes the aforementioned goals.

As is a further object to provide for the same at relatively little cost thereby making it generally available to all eyeglass wears.

These and other objects and advantages of the invention will become more apparent from the following detailed disclosure and claims and by reference to the accompanying drawings, in which:

Figure 1:
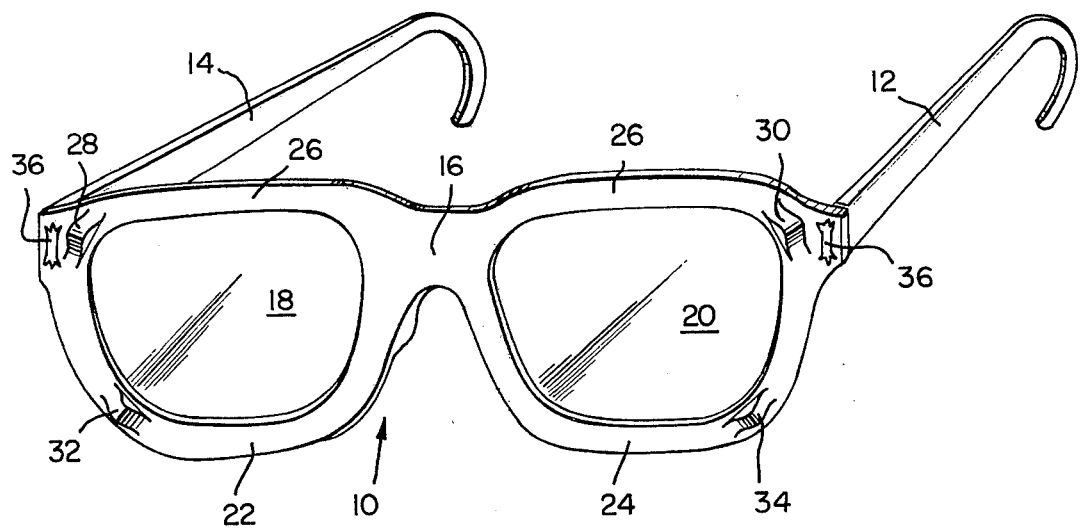
FIG. 1 is a front elevational view of the eyeglass frame.
Figure 2:
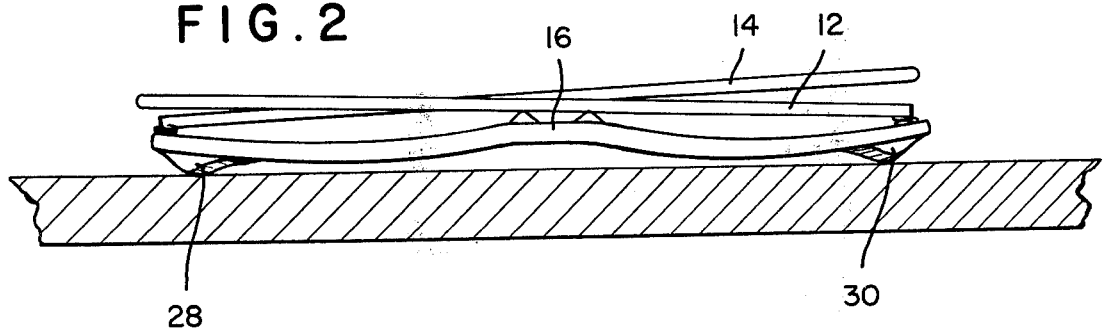
FIG. 2 is a side view thereof showing the frame collapsed and lying on a surface.
Figure 3:
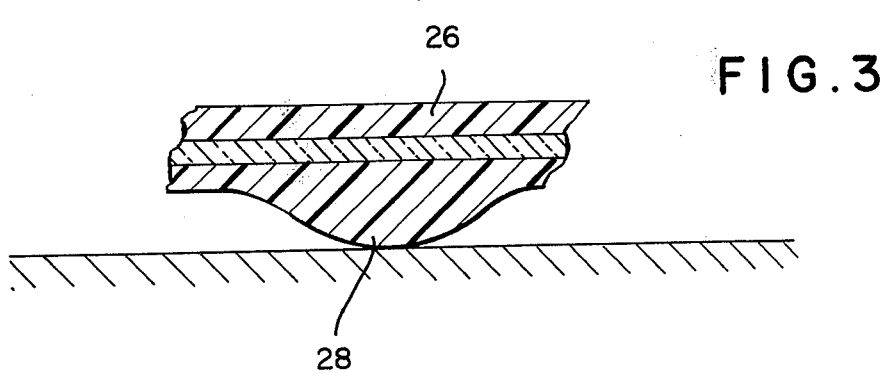
FIG. 3 is a detailed sectional view of the novel means employed with the frames.

Broadly speaking, the instant invention includes the provision of an eyeglass frame for a pair of lenses comprising a main frame having a front surface and defining a pair of apertures each adapted to receive a lens, a pair of ear pieces integral with the main frame on fore side thereof, the main frame further including a pair of raised protrusion on the surface defining the aperture and being adjacent thereto, the pair of raised protrusions being out of planar alignment with the surface each of the pair being disposed on the fore side of the frame.

DETAILED DISCLOSURE

Referring more particularly to the drawing, there is shown an eyeglass frame 10 having a pair of ear pieces or temples 12, 14 and a top surface 16. A pair of lenses 18, 20 are adapted to fit into the slots 22, 24 defined in the frame 10 provided therefor. The slots 22, 24 are more specifically defined by a front member 28 that is adapted to receive the lenses 18, via the slots 22, 24. The front member 26 will generally have four protrusions 28, 30, 32, 34, two at the top 28, 30 and two 32, 34 at the bottom, e.g. a pair on the lateral far side of each slot. Each upper pair 28, 30 will generally be in the area adjacent the hinged connection 38 of the temple 12, 14 to the front member 26, whereas the lower pair will be disposed along the lower portion of the front member 26. These protrusions or bumps will be defined as being out of planar alignment with the balance of the front member 26. The protrusion can be unitary with the front member 26 such as by being molded thereon or or subsequently affixed thereto by suitable means, such as adhesive or the like.

Since it is obvious that numerous changes and modifications can be made in the above-described details without departing from the spirit and nature of the invention, it is to be understood that all such changes and modifications are included within the scope of the invention.

What is claimed is:

1. An eyeglass frame for a pair of lenses comprising a main frame having a normally substantially planar front surface and defining a pair of apertures each adapted to receive a lens, a pair of ear pieces integral with said main frame on a far side thereof, said main frame further including two pair of raised protrusions on said surface and each being adjacent one of said apertures, said raised protrusions being out of planar alignment with said surface, each pair being disposed on the far side of said frame and being operative to raise said frame when said surface is in substantially parallel contact with a support, each of said protrusions being arcuate in shape and of non-uniform cross-section, a portion of said protrusion at the largest cross-section being operative to contact said support and keep said lenses above the same when said surface is substantially parallel thereto.

2. The frame as defined in claim 1 wherein said protrusions are unitary with said frame.

3. The frame as defined in claim 1 wherein said protrusions are integral with said frame.

4. The frame as defined in claim 1 including a pair of lenses.

* * * * *